United States Patent [19]
Martenas et al.

[11] Patent Number: 5,199,522
[45] Date of Patent: Apr. 6, 1993

[54] AIR INLET FOR VEHICLE ENGINE

[75] Inventors: Wayne B. Martenas, New Holland, Pa.; Philip Gaff, Prittlewell, England

[73] Assignee: Ford New Holland, Inc., New Holland, Pa.

[21] Appl. No.: 888,676

[22] Filed: May 27, 1992

[51] Int. Cl.⁵ .............................................. B60K 13/02
[52] U.S. Cl. .............................. 180/68.3; 55/DIG. 28
[58] Field of Search ................... 180/68.1, 68.2, 68.3; 123/41.46, 41.44; 55/DIG. 28

[56] References Cited

U.S. PATENT DOCUMENTS 3,232,368  2/1966  Sullivan .............................. 180/68.3
4,354,458  10/1982  Bury .................................. 180/68.3

FOREIGN PATENT DOCUMENTS 1066887  3/1960  Fed. Rep. of Germany .
2059890  4/1981  United Kingdom .

Primary Examiner—Richard M. Camby
Attorney, Agent, or Firm—Frank A. Seemar; Larry W. Miller

[57] ABSTRACT

A vehicle having an engine compartment with an engine and an air cleaner mounted therein is disclosed wherein the cover for the engine compartment comprises two hinge panels with an air inlet formed in each one thereof. An air duct extends from within the vicinity of the air inlets in the hinge panels to an inlet of the air cleaner and includes an air plenum chamber defined in the engine compartment cover. The plenum chamber has an air inlet adjacent the air inlets in the engine compartment cover and an air outlet connectable to the air inlet of the air cleaner.

7 Claims, 3 Drawing Sheets

AIR INLET FOR VEHICLE ENGINE

BACKGROUND OF THE INVENTION

This invention relates to an air inlet arrangement for the engine of a vehicle. The invention has been conceived in connection with the engine of an agricultural tractor and will, in the main, be discussed in relation thereto. However, it is to be noted that the invention is applicable to any vehicle.

It is commonplace to take ambient air, clean it and pass it to the air inlet manifold of an engine where it is used for mixing with the fuel in proportions to give the right air/fuel mixture for combustion. There are two main requirements in respect of the air fed to an engine, namely that it be free from foreign matter, such as dust, and be as cool as possible. The first requirement is met by providing an air cleaner or filter and this is conventional. Ideally, the air filter is mounted closely adjacent the engine so that there is only a relatively short air duct between the outlet of the air filter and the air inlet of the engine. This means that, if ambient air is to be taken in directly at the air filter, then an air intake has to be positioned in the vicinity of the air filter and, in the case of an agricultural tractor for example, this would mean providing an air intake pipe extending through the hood or cover for the engine compartment at a location immediately in front of the cab windscreen and thus this would interfere with the operator's visibility.

Accordingly, it has been the practice to move this air intake pipe to the front of the engine compartment so as to reduce inference with the operator's visibility but this has meant providing an air duct between the air inlet pipe and the air filter. This duct, which may be in the form of a hose of the order of 10 cm in diameter, is routed through the engine compartment to the air filter and this gives rise to two disadvantages. The first disadvantage is that the duct passes through the engine compartment, the temperature of which, in use of the vehicle, is considerably higher than the ambient temperature which means that the temperature of the air fed to the engine is elevated, thus detracting from the performance of the engine inasmuch as the higher the temperature of the air is, the less efficient the operation of the engine is. The second disadvantage is that the air duct obscures many components in the engine compartment, whereby access to these components for maintenance purposes is difficult. Furthermore, the air inlet pipe is normally fitted with a rain cowl or cap and both this cap and the pipe may have to be dismantled in order to gain access to the engine compartment.

SUMMARY OF THE INVENTION

According to the present invention there is provided a vehicle comprising an engine compartment with an engine and an air cleaner mounted therein, a cover for the engine compartment; said cover including air inlet means and, air duct means extending from within the vicinity of said air inlet means in said cover to an inlet of the air cleaner and characterized in that the air duct means comprises an air plenum chamber provided in the engine compartment cover; said plenum chamber having an air inlet adjacent the air inlet means in the engine compartment cover and an air outlet connectable to the air inlet of the air cleaner.

The engine compartment cover may comprise two pivotally mounted hinge panels, in which case the plenum chamber is preferably provided in one of these hinge panels, whereby, when that hinge panel is raised to afford access to the engine compartment, the air plenum chamber is moved with it and therefore does not impair access to components in the engine compartment. This hinge panel may be generally L-shaped and the plenum chamber is conveniently provided along the corner of the two limbs of that panel by providing a plate which spans said corner. The air outlet of the plenum chamber may be an aperture formed in a wall of the chamber and the air inlet of the air cleaner may be in the form of an inlet pipe carrying at its outer end a peripheral seal which is engageable with the periphery of the air outlet of the plenum chamber when the said one hinge panel is in the closed position and automatically disengages the periphery of the air outlet when this hinge panel is in its open position in which access can be gained to the engine compartment.

It will be understood that the engine compartment cover is relatively close fitting with respect to components housed in the engine compartment, such as the fuel tank, and the radiator of the engine cooling system. The outline of these components is unlikely to be linear but with the use of a plate to define one wall of the plenum chamber, this is readily contoured to suit that outline and maximize the cross-sectional area of the plenum chamber at any given point.

The air inlet of the engine compartment is preferably located forwardly of the radiator of the engine cooling system and, in order to prevent air from within the engine compartment, and thus at an elevated temperature, entering the inlet of the plenum chamber, a seal may be provided between the components housed in the engine compartment and a point rearwardly of the air inlet of the plenum chamber. This seal will be contoured at one edge so as to follow the outline of the adjacent components, and contoured at the opposite edge in order to follow the contour of the hinge panels with which it is engageable when the latter are in the closed position. Conveniently, this seal is composed of a foamed synthetic plastics material which can be molded or otherwise shaped to the required contour.

BRIEF DESCRIPTION OF THE DRAWINGS

A tractor embodying the present invention will now be described in greater detail, by way of example, with reference to the accompanying drawings, in which.

DETAILED DESCRIPTION OF THE PREFERRED EMBODIMENT

Figure 1:
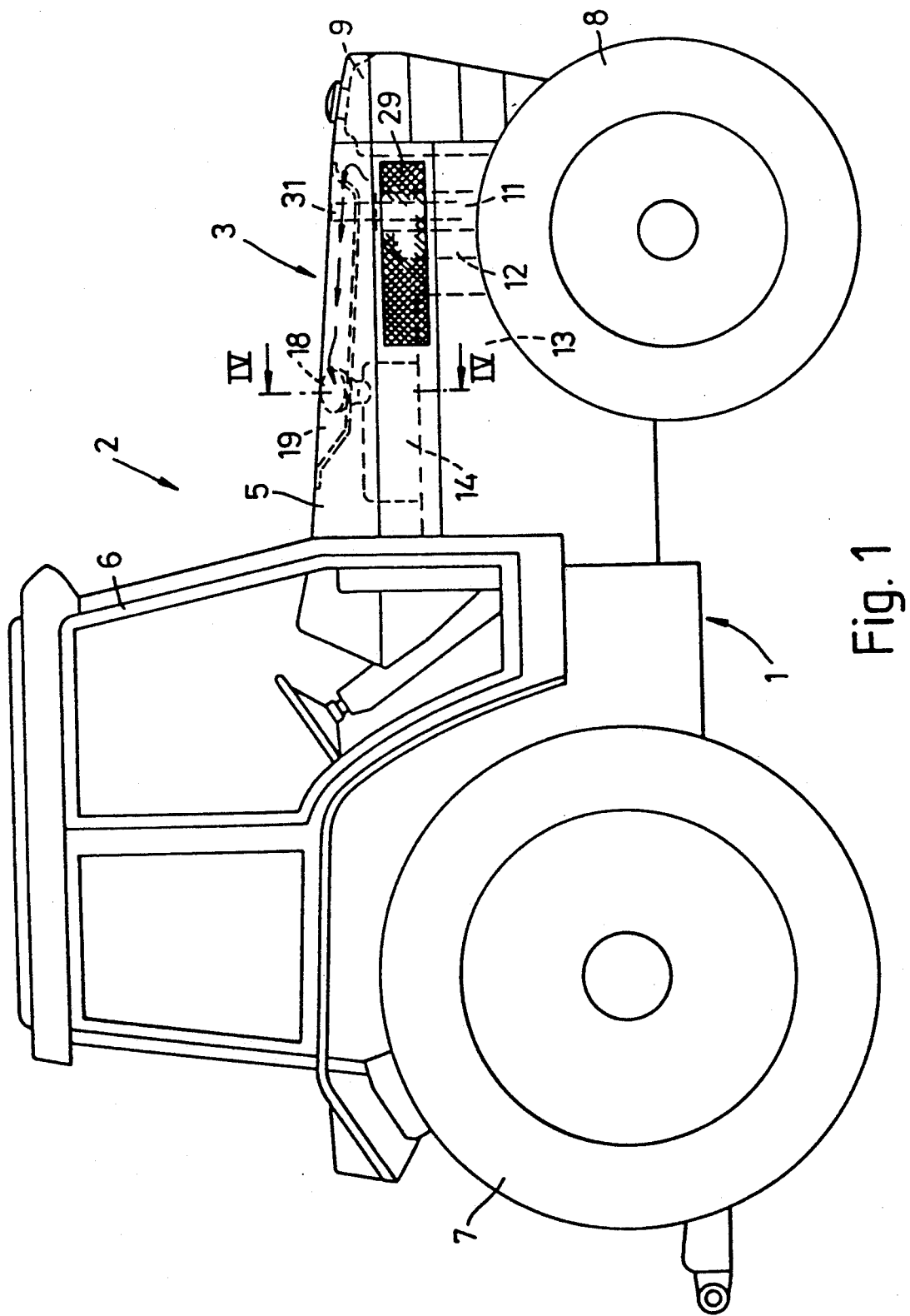
FIG. 1 is a schematic side view of the tractor incorporating the principles of the instant invention.

Referring first to FIG. 1, the tractor comprises a base structure 1 on which is mounted bodywork 2 including an engine compartment cover 3 having a.o. two pivotally mounted hinge panels 5. The bodywork 2 also includes an operator cab 6 which is also mounted on the base structure 1. A pair of rear, ground-engaging wheels 7 are provided, together with a pair of front, steerable, ground-engaging wheels 8.

Mounted forwardly of, and within, the engine compartment is a fuel tank assembly 9, immediately behind which is mounted a radiator 11 of the engine cooling system and behind that is mounted a fan assembly 12 which draws air through the radiator 11. Behind the fan assembly 12 is mounted the engine 13. Also mounted within the engine compartment is an air cleaner or filter 14 which cleans ambient air before passing it to the air inlet of the engine 13 for mixture with fuel to provide the necessary air/fuel mixture for combustion.

Figure 2:
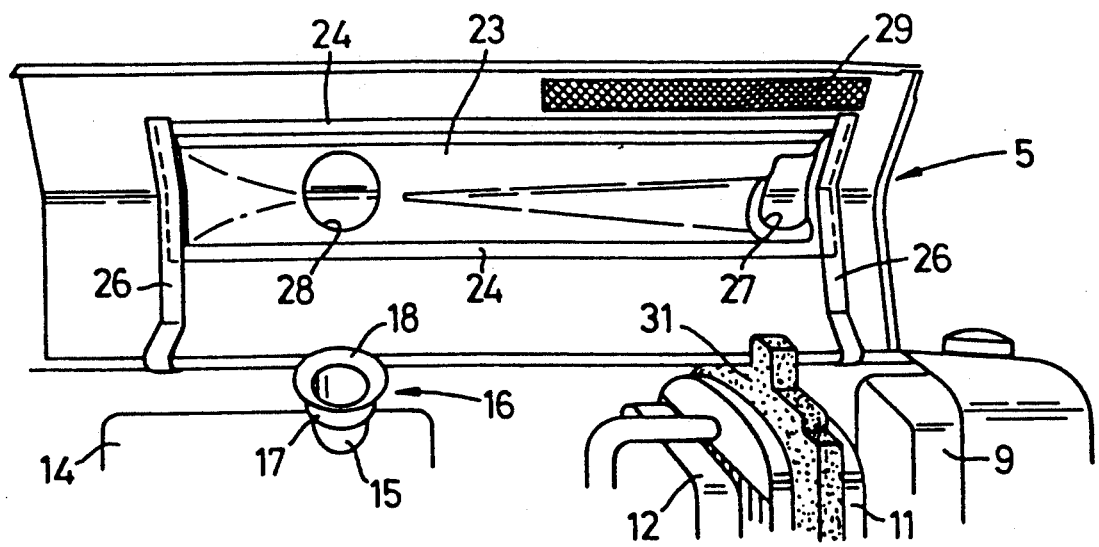
FIG. 2 is a side view of part of the engine compartment of a tractor of which a hinge panel of a cover is in the open position.
Figure 3:
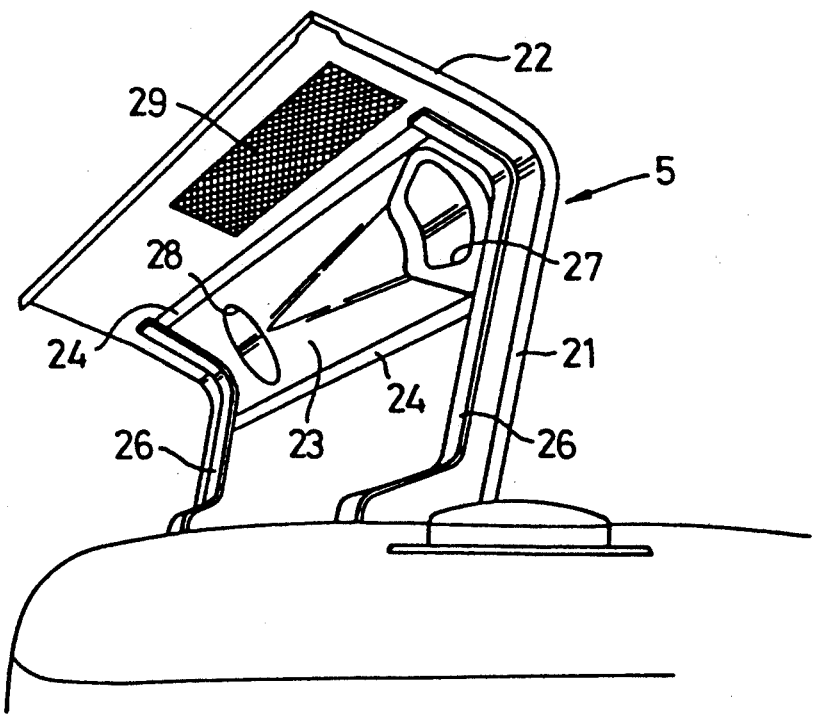
FIG. 3 is a perspective view depicted generally from the right-hand side of FIG. 2.
Figure 4:
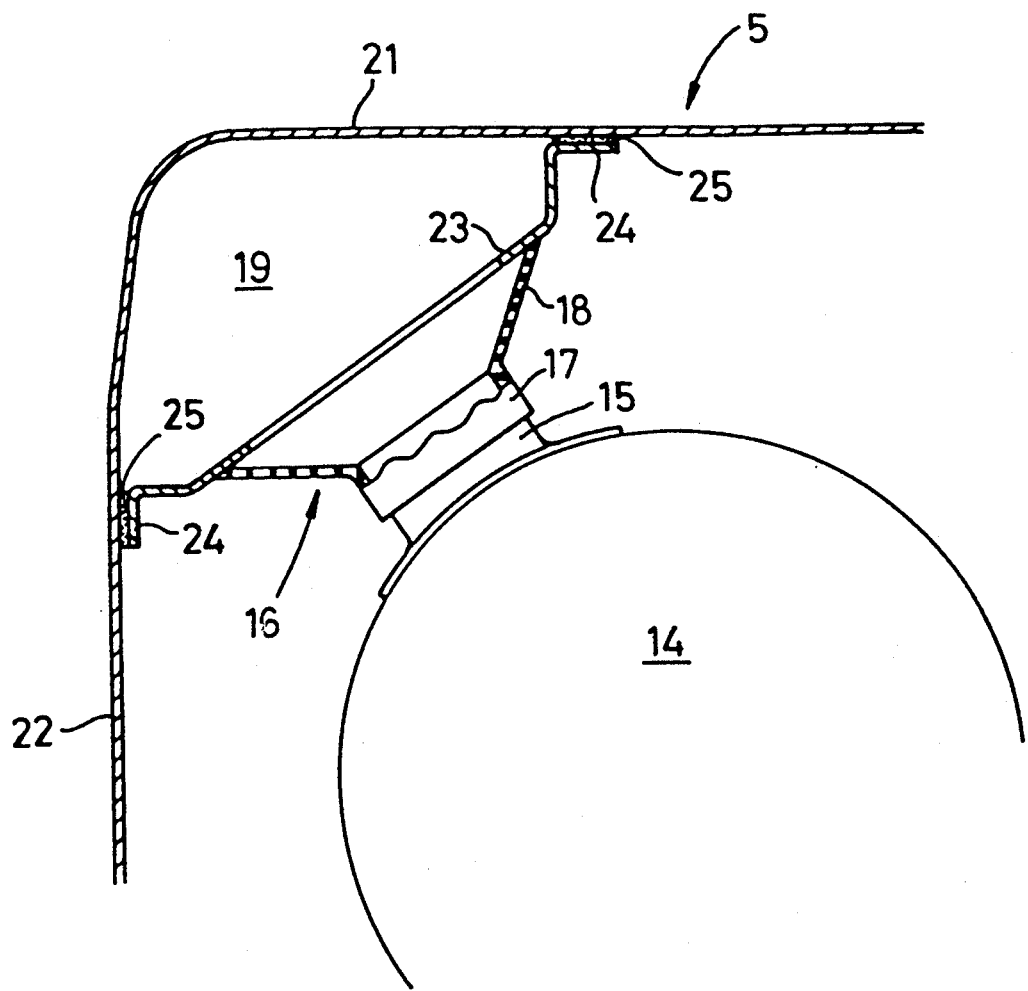
FIG. 4 is a schematic cross-sectional view taken along lines IV—IV of FIG. 1.

Turning now also to FIGS. 2, 3 and 4, the air filter 14 is provided with an air inlet pipe 15 around the mouth of which is fitted a seal 16 which has a collar 17 which fits on the inlet pipe 15 and may be clamped thereto. The seal 16 further also comprises an outwardly flared portion 18 and preferably is molded from a flexible, synthetic plastics material.

Ambient air, that is air from outside the engine compartment, is ducted to the air filter inlet 15 by a plenum chamber 19 which is provided in one of the hinge panels 5 of the engine compartment cover 3 which is generally L-shaped having two limbs 21 and 22. The plenum chamber 19 is provided along the corner of this panel 5 and is thus generally triangular in cross-section as seen best in FIG. 4 of the drawings. More specifically, the plenum chamber 19 is defined, on two sides, by portions of the two generally orthogonal limbs 21 and 22 of the hinge panel 5 and, on the third side or hypotenuse, by a plate 23 which has out-turned flanges 24 by which it is secured, using adhesive 25, to the undersides of the limbs 21 and 22 of said panel 5.

The plenum plate 23 extends between two hinge brackets 26 having stepped portions to receive the ends of the plenum plate and which further also are secured to the underside of the hinge panel 5 using adhesive. It will be appreciated that the plenum plate 23 and the hinge brackets 26 may be attached to the hinge panel 5 other than by adhesive but the use of the latter ensures that there are no blemishes visible from the outside of the hinge panel which thus enhances the aesthetic appearance of the engine compartment cover.

The plenum plate 23 is formed with an air inlet aperture 27 and an air outlet aperture 28. The air outlet aperture 28 is circular and has a diameter greater than that of the air inlet pipe 15 of the air filter 14 but less than the outer end of the flared portion 18 of the seal 16. As best seen in FIG. 4 of the drawings, when the hinge panel 5 is in the closed position, the outer end of the flared portion 18 of the seal 16 engages around the air outlet aperture 28 of the plenum chamber 19 whereby the air inlet pipe 15 of the air filter 14 is sealed against the ingress of air from within the engine compartment, which air, in use of the vehicle, is at an elevated temperature. The flexibility of the seal 16 takes up any manufacturing tolerances and always ensures a satisfactory air seal around the air outlet 28 of the plenum chamber 19. It will be appreciated that this seal is automatically made and broken as the hinge panel 5 is moved to the closed and open positions, respectively.

The air inlet 27 of the plenum chamber 19 is disposed forwardly of the radiator 11 and receives ambient air through a grid or mesh 29 provided in the limb 22 of the hinge panel 5. Such a grid or mesh 29 is provided in each of the hinge panels 5 and serves also to ventilate the engine compartment. In order to ensure that only ambient air is drawn into the air inlet 27 of the plenum chamber 19, it is preferable to seal that inlet 27 from the engine compartment by providing a seal over the radiator 11 which is contoured at one edge to follow the outline of the radiator 11 and contoured at the opposite edge to follow the outline of the inside surface of the hinge panels 5. This seal 31 is conveniently molded from a synthetic plastics material.

It will be appreciated that the volume of the plenum chamber 19 needs to be as large as possible in order not to starve the engine of air and to this end, the plenum plate 23 is contoured so as closely to follow the components, such as the radiator 11, adjacent thereto.

It will also be appreciated that the plenum chamber 19 has a surface area of which the major part is formed from portions of the limbs 21 and 22 of the hinge panel 5, which portions are subjected to ambient temperature. Only the plenum plate 23 is subjected to the temperature within the engine compartment and thus, air flowing through the plenum chamber 19 will be cooler than the air within the engine compartment although it may be slightly hotter than the ambient air. As already mentioned, it is important to provide air to the engine as cool as possible in order to maximize the efficiency of the engine. Tests have been carried out on the basis of running the engine, first with the seal 16 in place and then removed and the power output of the engine was found to drop by one-half horse power when the seal was removed.

Apart from the provision of the plenum chamber 19 as the duct for ambient air to the air filter 14, which air, in use of the tractor, is kept at a temperature lower than the temperature within the engine compartment, it will also be seen that this arrangement automatically removes the plenum chamber 19 from within the engine compartment when the hinge panel 5 is hinged to the open position, which is shown in FIGS. 2 and 3 of the drawings. Thus, in this position of said hinge panel 5, the plenum chamber 19 in no way obscures any of the components within the engine compartment and hence, access to these components for maintenance purposes is not hindered by said plenum chamber 19. Furthermore, the plenum plate 23 also helps to rigidify the hinge panel 5 and thus reduce vibration and noise.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A vehicle having an engine compartment with an engine and an air cleaner mounted therein; and a cover for the engine compartment, said cover including air inlet means for the passage of ambient air through said cover, and air duct means extending from within the vicinity of said air inlet means in said cover to an inlet of the air cleaner to direct the flow of ambient air to said air cleaner, the improvement comprising:

said air duct means incorporates an air plenum chamber provided within said engine compartment cover, said plenum chamber having an air inlet adjacent the air inlet means in the engine compartment cover and an air outlet connectable to the air inlet of the air cleaner;

said engine compartment cover including two pivotally mounted hinge panels, at least one of said hinge panels having a pair of limbs arranged in a generally L-shaped configuration, said plenum chamber being provided along a corner between said two limbs and having a generally triangular cross-sectional configuration defined on two sides by the respective limbs of said at least one hinge panel and on the third side by a plenum plate.

2. A vehicle according to claim 1 wherein said plenum plate is contoured so as to be closely adjacent to components mounted in the engine compartment and, thereby, maximize the cross-sectional area of the plenum chamber.

3. A vehicle according to claim 1 wherein said plenum plate is attached to the interior of the hinge panel using an adhesive.

4. A vehicle according to any of claim 1 wherein said hinge panel has a pair of hinge brackets pivotally mounting said cover to said engine compartment, said plenum plate extending between said hinge brackets.

5. A vehicle according to claim 4 wherein said air outlet of the plenum chamber is in the form of an aperture and the air inlet of the air cleaner is in the form of an inlet pipe fitted with sealing means which engage around the circumference of the air outlet aperture of the plenum chamber when the hinge panel is in the closed position.

6. A vehicle according to claim 5 wherein the sealing means comprises a flexible seal having a collar fitted to the air inlet pipe of the air cleaner and an outwardly flared portion having an outer periphery engageable with the outlet of the plenum chamber.

7. A vehicle according to claim 6 wherein the air inlet of the plenum chamber is sealed from the engine compartment.

* * * * *